US010737277B2

(12) United States Patent
Luo et al.

(10) Patent No.: US 10,737,277 B2
(45) Date of Patent: Aug. 11, 2020

(54) AIR CLEANER

(71) Applicant: CREATIVE TECHNOLOGY CORPORATION, Kawasaki-shi, Kanagawa (JP)

(72) Inventors: Li Luo, Kawasaki (JP); Yoshiaki Tatsumi, Kawasaki (JP); Kazuki Tsuboi, Kawasaki (JP)

(73) Assignee: CREATIVE TECHNOLOGY CORPORATION, Kawasaki-Shi, Kanagawa (JP)

( * ) Notice: Subject to any disclaimer, the term of this patent is extended or adjusted under 35 U.S.C. 154(b) by 207 days.

(21) Appl. No.: 15/743,105

(22) PCT Filed: Sep. 8, 2016

(86) PCT No.: PCT/JP2016/076508
§ 371 (c)(1),
(2) Date: Jan. 9, 2018

(87) PCT Pub. No.: WO2017/043599
PCT Pub. Date: Mar. 16, 2017

(65) Prior Publication Data
US 2019/0076852 A1 Mar. 14, 2019

(30) Foreign Application Priority Data
Sep. 9, 2015 (JP) .................................. 2015-178005

(51) Int. Cl.
*B03C 3/16* (2006.01)
*B03C 3/47* (2006.01)
(Continued)

(52) U.S. Cl.
CPC ................. *B03C 3/15* (2013.01); *B03C 3/47* (2013.01); *B03C 3/49* (2013.01); *B64C 27/08* (2013.01);
(Continued)

(58) Field of Classification Search
CPC .... B03C 3/15; B03C 3/47; B03C 3/49; B03C 3/02; B03C 3/40; B03C 3/45;
(Continued)

(56) References Cited

U.S. PATENT DOCUMENTS 3,740,925 A * 6/1973 Gothard .................... B03C 3/38
95/74
8,920,537 B2 * 12/2014 Seike ...................... B03C 3/017
244/116

(Continued)

FOREIGN PATENT DOCUMENTS

CN 203737396 U 7/2014
CN 104354856 A 2/2015
(Continued)

OTHER PUBLICATIONS

Europe Patent Office, "Search Report for European Patent Publication No. 16844460.2," dated Mar. 28, 2019.
(Continued)

*Primary Examiner* — Minh Chau T Pham
(74) *Attorney, Agent, or Firm* — Manabu Kanesaka

(57) ABSTRACT

An air cleaner includes a flying body having a main body unit in which a control unit controlling flying movement is stored, and a propeller disposed around the main body as propulsion for floating the flying body; and a dust collector connected to the flying body, and including an intake opening and an exhaust opening. The propeller is disposed inside or under the dust collector, the dust collector electrostatically attracts dust in air flowing from the intake opening, and the flying body is a drone structured so that the propeller takes in air from an upper side and exhausts the air to a lower side.

9 Claims, 16 Drawing Sheets

(51) Int. Cl.
*B03C 3/49* (2006.01)
*B03C 3/02* (2006.01)
*B03C 3/40* (2006.01)
*B03C 3/45* (2006.01)
*B64C 27/08* (2006.01)
*B64C 39/02* (2006.01)
*F24F 7/007* (2006.01)
*F24F 7/00* (2006.01)
*B03C 3/15* (2006.01)
*F24F 3/16* (2006.01)

(52) U.S. Cl.
CPC ............ *B64C 39/02* (2013.01); *B64C 39/024* (2013.01); *F24F 3/166* (2013.01); *F24F 7/00* (2013.01); *F24F 7/007* (2013.01); *B64C 2201/024* (2013.01); *B64C 2201/108* (2013.01); *B64C 2201/12* (2013.01); *F24F 2221/12* (2013.01)

(58) Field of Classification Search
CPC . B64C 39/024; B64C 27/08; B64C 2201/024; B64C 2201/108; B64C 2201/12; B64C 39/02; F24F 3/166; F24F 7/007; F24F 2221/12; F24F 7/00
USPC ............ 55/385.1, 385.2, 385.3; 95/3, 8, 57; 96/15, 417; 244/30, 127, 116, 96, 33, 244/58–60, 126; 446/33, 225; 136/292; 60/202, 204; 313/359.1, 362.1; 320/DIG. 33
See application file for complete search history.

(56) References Cited

U.S. PATENT DOCUMENTS

| | | | |
|---|---|---|---|
| 10,315,528 B1* | 6/2019 | Crawford, Jr. | B60L 53/30 |
| 2006/0016338 A1* | 1/2006 | Foldi | B03C 3/019 96/64 |
| 2015/0040760 A1 | 2/2015 | Braden et al. | |
| 2018/0319490 A1* | 11/2018 | Baek | B64C 27/48 |
| 2018/0354620 A1* | 12/2018 | Baek | B64C 39/024 |

FOREIGN PATENT DOCUMENTS

| | | | | |
|---|---|---|---|---|
| CN | 108344157 A * | 7/2018 | | F24F 13/20 |
| JP | S49-21771 B | 2/1971 | | |
| JP | H10-057837 A | 3/1988 | | |
| JP | H05-146623 A | 6/1993 | | |
| JP | H06-45648 U | 6/1994 | | |
| JP | H08-131883 | 5/1996 | | |
| JP | 2012-170869 A | 9/2012 | | |
| JP | 2014-515086 A | 6/2014 | | |
| JP | 2014-128203 A | 7/2014 | | |
| JP | 2015-137092 A | 7/2015 | | |
| WO | WO 2019/131190 A1 * | 4/2019 | | B03C 3/32 |

OTHER PUBLICATIONS

PCT, "International Search Report for International Application No. PCT/JP2016/076508" dated Nov. 8, 2016.

* cited by examiner

AIR CLEANER

RELATED APPLICATIONS

The present application is National Phase of International Application No. PCT/JP2016/076508 filed Sep. 8, 2016, and claims priority from Japanese Application No. 2015-178005, filed Sep. 9, 2015, the disclosures of which is hereby incorporated by reference herein in its entirety.

TECHNICAL FIELD

The present invention relates to an air cleaner that floats in the air and can collect dust in the air.

BACKGROUND ART

Conventionally, as an air cleaner of this kind, for example, technologies are described in Patent Literature 1 and Patent Literature 2.

An air cleaner described in Patent Literature 1 includes a dust collecting body to attract dust in the air, a flying means that causes this dust collecting body to float in the air by using a propeller, and a control device that controls this flying means.

With this construction, when the flying means is driven to cause the air cleaner to float in a room, the floating air cleaner attracts dust floating in the air by a fixed electronic nonwoven fabric on a surface of the dust collecting body. In addition, dust attached to top surfaces of furniture and shelves placed in the room is raised into the air and attracted to this fixed electronic nonwoven fabric.

On the other hand, an air cleaner described in Patent Literature 2 includes a flying body constituted of a propeller-driven balloon, and a dust collector attached to this flying body. The dust collector is formed of a container having an intake opening and an exhaust opening that can be electrically charged with polarities opposite to each other.

With this construction, when the flying body is moved in the air by propulsion of a propeller, air flows into the dust collector through the intake opening. Accordingly, electrically charged dust in the air is collected around the intake opening, the inside, and the exhaust opening of the dust collector.

CITATION LIST

Patent Literature

Patent Literature 1: Japanese Application Laid-Open No. H08-131883
Patent Literature 2: Published Japanese Translations of PCT International Publication for Patent Applications No. 2014-515086

SUMMARY OF THE INVENTION

Technical Problems

However, the conventional air cleaners described above have the following problems.

The air cleaners described in Patent Literature 1 and Patent Literature 2 are structured to collect dust by bringing the dust into contact with the dust collector while moving the flying body by propulsion of the propeller. Therefore, a dust collection rate per unit time depends on a speed and a path of the flying body. Therefore, when the speed of the flying body is low and the flying body does not move around well, the dust collection rate decreases.

In particular, like the air cleaner described in Patent Literature 2, in a structure in which the intake opening and the exhaust opening of the dust collector have different electric charges, when the structure is constructed to electrically charge dust by application of a high voltage, for insulation, it is necessary to space electrodes of the intake opening and the exhaust opening from each other so that the intake opening and the exhaust opening are away from each other.

When the dust collector structured as described above is attached to a position having an influence on an air flow of a propulsion mechanism for the flying body, it significantly influences propulsion of the flying body. In addition, the dust collector becomes large in size, and the center of gravity of the whole air cleaner moves due to the dust collector attaching position. Therefore, control of the flying body becomes very difficult.

The present invention was made to solve the above-described problems, and an object thereof is to provide an air cleaner which can take air in a wider range into a dust collector, to which a small dust collector can be attached without dropout of dust from the dust collector.

Solution to the Problems

In order to solve the above-described problems, the invention of a first aspect is an air cleaner including a flying body capable of floating by using a propeller as propulsion, and a dust collector that has an intake opening and an exhaust opening and electrostatically attracts dust in the air flowing in from the intake opening, constructed so that the dust collector is fitted to the propeller so that the propeller of the flying body is at any of a position near the intake opening of the dust collector, a position inside the dust collector, and a position near the exhaust opening, the dust collector includes a plurality of cylindrical attraction units each of which includes an electrode, and which are fitted concentrically so that the electrodes adjacent to each other oppose each other, and a power supply unit to generate a potential difference between the electrodes opposing each other, and the flying body is a drone structured so that a plurality of the propellers that take in air from an upper side and exhaust air to a lower side are disposed around a main body unit including a control unit that controls flying movement.

With this construction, the flying body is floated by propulsion of the propeller. Along with floating of the flying body, dust in the air is suctioned into the dust collector from the intake opening and electrostatically attracted by the dust collector. In detail, since the propeller is at any of a position near the intake opening, a position inside the intake opening, and a position near the exhaust opening of the dust collector, air in a wider surrounding range is forcibly suctioned into the dust collector by an intake force and an exhaust force of the propeller. As a result, air in a wider range can be taken into the dust collector, and therefore, even when the speed of the flying body is low and the flying body does not move around well, a sufficient dust collection rate can be obtained.

In addition, the dust collector is structured to electrostatically attract dust and collect dust, so that the dust collector strongly attracts even very small dust not larger than 1 μm, unlike the air cleaner described in Patent Literature 1. Therefore, even when there is wind or a slight impact on the dust collector, dust does not drop from the dust collector. That is, the air cleaner of the present invention has very high dust cleanliness efficiency as compared with the air cleaner described in Patent Literature 1.

Further, the air cleaner of the present invention is structured to electrostatically attract dust in the air which has flown into the dust collector from the intake opening, so that unlike the air cleaner described in Patent Literature 2, even when the dust collector is set to have high-voltage specifications, the dust collector itself does not increase in size.

By thus setting the dust collector to have high-voltage specifications, ions and ozone, etc., can be generated, and therefore, not only the dust collection efficiency is improved, but also a sterilization effect and an allergen deactivation effect can be obtained.

The surrounding air is forcibly suctioned into the dust collector by an intake force and an exhaust force of the propeller. At this time, the dust collector is constructed by a plurality of cylindrical attraction units fitted concentrically, so that portions between the plurality of cylindrical attraction units serves as air passages, and forcibly suctioned air is distributed through the plurality of air passages. Then, when the power supply unit of the dust collector is on, a potential difference is generated between the electrodes opposing each other, and one of the electrodes opposing each other becomes a positive pole and the other becomes a negative pole. As a result, dust in the air electrically charged with negative polarity is attracted to a surface of the attraction unit including the electrode as a positive pole, and dust in the air electrically charged with positive polarity is attracted to a surface of the attraction unit including the electrode as a negative pole.

The invention of a third aspect is the air cleaner according to a first aspect, constructed so that a portion of the attraction units on an intake opening side is expanded by being tapered so that the intake opening of the dust collector becomes larger in diameter than the exhaust opening.

With this construction, a large amount of air can be smoothly flowed into the attraction units from the intake opening with the large diameter.

The invention of a fifth aspect is an air cleaner including a flying body capable of floating by using a propeller as propulsion and a dust collector that includes an intake opening and an exhaust opening and electrostatically attracts dust in the air flowing in from the intake opening, constructed so that the dust collector is fitted to the propeller so that the propeller of the flying body is at any of a position near the exhaust opening, the dust collector includes a plurality of sheet-shaped attraction units each of which includes an electrode and one or more holes, and which are aligned at fixed intervals in a an up-down direction, and a power supply unit to generate a potential difference between the electrodes of the attraction units adjacent to each other in the up-down direction, and the flying body is a drone structured so that a plurality of the propellers that take in air from an upper side and exhaust air to a lower side are disposed around a main body unit including a control unit that controls flying movement.

With this construction, surrounding air is suctioned from the hole of the attraction unit on one end toward the attraction unit in a subsequent stage by an intake force of the propeller. The air has passed through the hole of the attraction unit in the subsequent stage is discharged from the hole on the other end by an exhaust force of the propeller. At this time, the air comes into contact with the plurality of attraction units, and dust in the air is electrostatically attracted by the attraction units.

The invention of a sixth aspect is the air cleaner according to any of a first aspect to fifth aspect, constructed so that each of the one or plurality of attraction units constituting the dust collector has a plurality of holes.

With this construction, air is suctioned not only from the intake opening of the dust collector but also from the plurality of holes of the attraction units into the dust collector, and discharged from the exhaust opening. Therefore, an air flow rate into the dust collector can be increased, and accordingly, the dust collection rate can be improved.

The invention of claim 7 is the air cleaner according to claim 6, constructed so that any or all of the one or plurality of attraction units are formed to be reticulated.

The invention of a twelfth aspect is the air cleaner according to a first aspect or a fifth aspect constructed so that a first magnetic member is fixed to the attraction units of the dust collector and a second magnetic member is fixed to the flying body, and by an attraction force generated by magnetic forces of the first and second magnetic memebers, the attraction units are removably fitted to the flying body.

Effects of the Invention

As described in detail hereinbefore, the air cleaner according to the present invention brings about an excellent effect of improving a dust collection rate per unit time by the dust collector. Accordingly, even in an almost stationary condition, dust can be sufficiently collected. In addition, dust in the air can be electrostatically attracted and strongly captured without dropout. Further, the dust collector itself can be downsized. By setting the dust collector to have high-voltage specifications, not only a dust collection effect but also a sterilization effect and an allergen deactivation effect can be obtained.

In particular the air cleaner brings about an effect of further improving the dust collection rate by increasing a contract area between air and the attraction unit. In addition the attraction units of the dust collector can be made to function as a cover of the propeller, so that foreign matter can be prevented from being caught in the propeller during low-level flight. Further this structure can be made to function as a ducted fan so that an effect of increasing the propulsion of the propeller can also be brought about.

The inventions of claim 3 and claim 6 bring about an effect of improving the dust collection rate by increasing a range of air to be taken into the dust collector.

BRIEF DESCRIPTION OF THE DRAWINGS

FIG. 7 are partial side views showing a method of fitting and removing attraction units to and from a propeller.

FIG. 10 are partial side views showing modifications of an attaching position of the attraction units.

FIG. 13 are exploded perspective views showing modifications of the second embodiment.

DESCRIPTION OF THE EMBODIMENTS

Hereinafter, best modes of the present invention will be described with reference to the drawings.

(First Embodiment)

Figure 1:
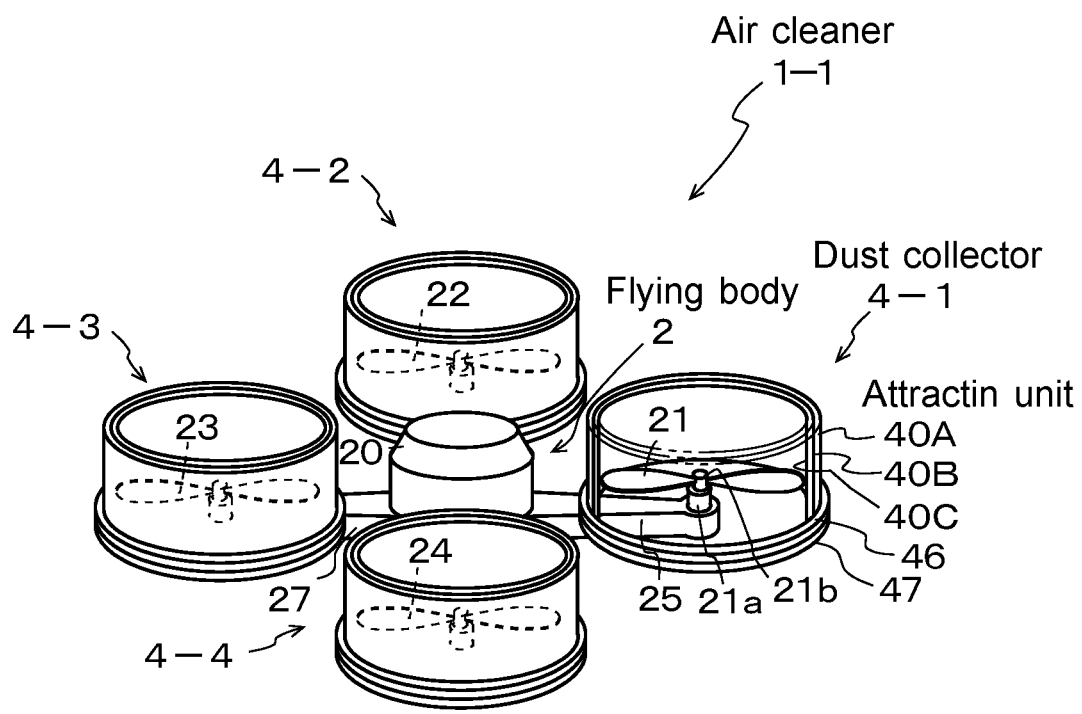
FIG. 1 is a perspective view showing an air cleaner according to a first embodiment of the present invention.
Figure 2:
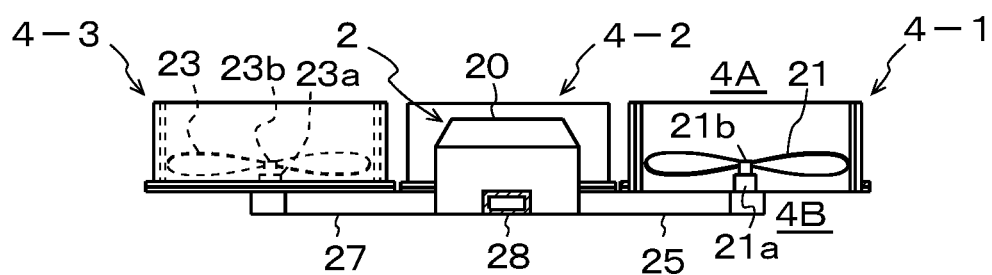
FIG. 2 is a partially cutaway schematic side view of the air cleaner.
Figure 3:
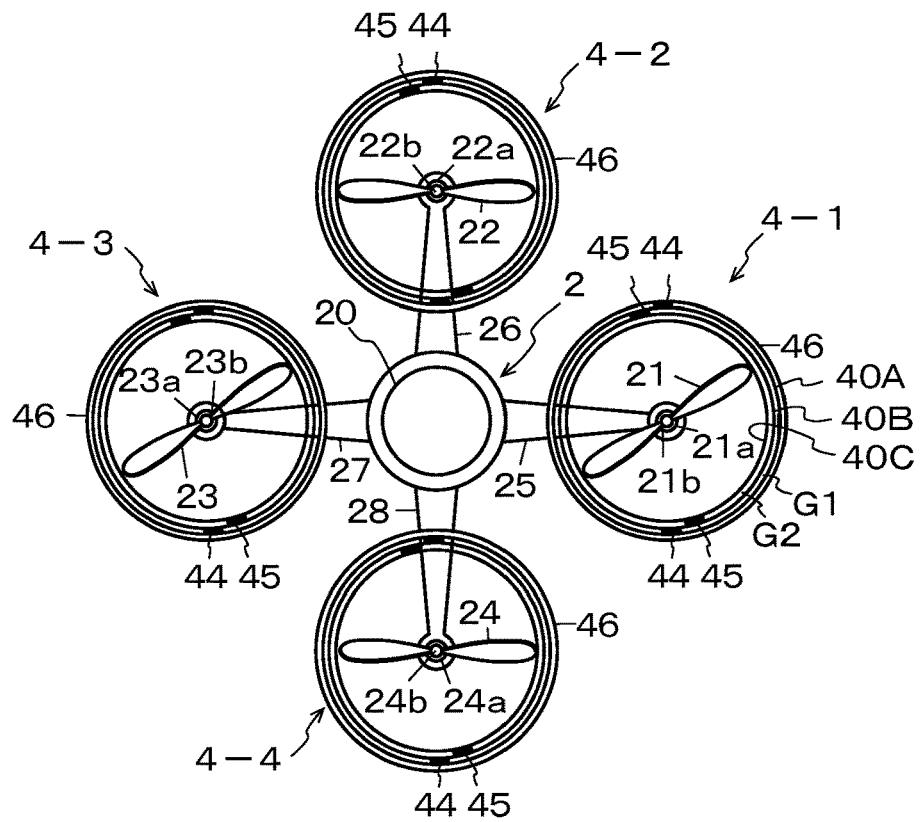
FIG. 3 is a plan view of the air cleaner.

FIG. 1 is a perspective view showing an air cleaner according to a first embodiment of the present invention, FIG. 2 is a partially cutaway schematic side view of the air cleaner, and FIG. 3 is a plan view of the air cleaner.

As shown in FIG. 1, the air cleaner 1-1 of the present embodiment is constructed by fitting four dust collectors 4-1 to 4-4 to a flying body 2.

The flying body 2 is a rotor type drone capable of floating vertically and horizontally by using a propeller as propulsion. As rotor type drones, there are those including various rotors such as a tri-rotor including three propellers, a quad-rotor including four propellers, a penta-rotor including five propellers, a hexa-rotor including six propellers, and an octo-rotor including eight propellers. In the present embodiment, a drone with a quad-rotor is applied as the flying body 2.

As shown in FIG. 2 and FIG. 3, this flying body 2 includes a main body unit 20, and four propellers 21 to 24 disposed around the main body unit 20.

The propellers 21 to 24 are attached to tip end portions of four frames 25 to 28 extending in a cross shape from the main body unit 20. Specifically, a motor 21a (22a-24a) is attached to a tip end upper portion of each frame 25 (26-28), and each propeller 21 (22 to 24) is fixed to a rotary shaft 21b (22b-24b) of each motor 21a (22a-24a).

Accordingly, by driving the motor 21a (22a-24a), the propeller 21 (22-24) rotates integrally with the rotary shaft 21b (22b-24b), and takes in air from an upper side and exhausts air to a lower side. That is, the propeller 21 (22-24) gives upward propulsion to the flying body 2 by rotation.

The main body unit 20 includes a control unit 30 that controls flying movement of the flying body 2.

Figure 4:
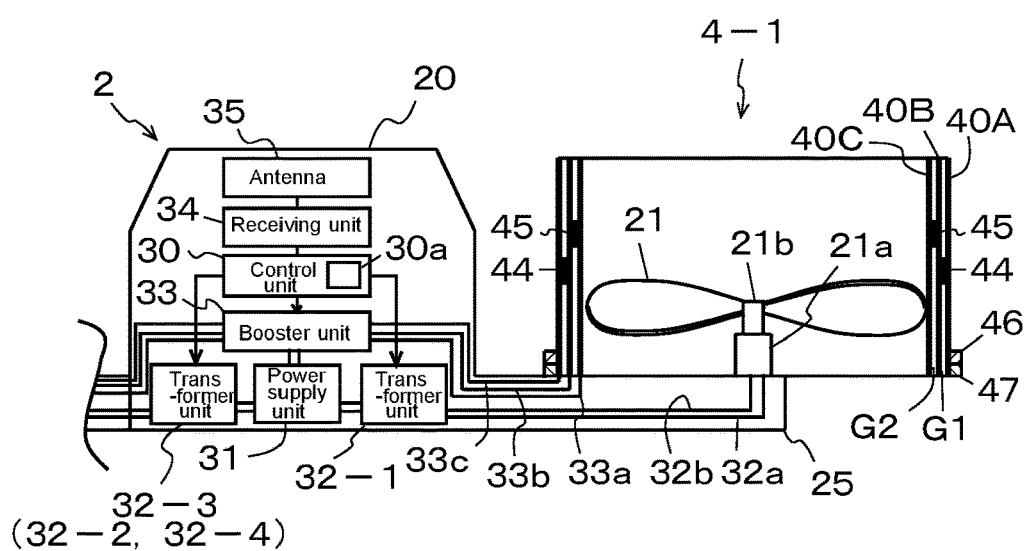
FIG. 4 is a schematic view describing a flying body control system.

FIG. 4 is a schematic view describing a control system of the flying body 2.

As shown in FIG. 4, the control unit 30 including a memory 30a, a power supply unit 31, four transformer units 32-1 to 32-4, a booster unit 33, a receiving unit 34, and an antenna 35 are housed in the main body unit 20.

The power supply unit 31 is connected to the four transformer units 32-1 to 32-4 and the booster unit 33, and an output terminal of each transformer unit 32-1 (32-2-32-4) is connected to an input terminal of a motor 21a (22a-24a) of each propeller 21 (22-24) via wirings 32a and 32b. An output terminal of the booster unit 33 is connected to the respective electrodes 42 inside attraction units 40A to 40C of a dust collector 4-1 (4-2-4-4) described below.

The control unit 30 can control an output voltage of the transformer unit 32-1 (32-2-32-4). Accordingly, the control unit 30 can change the number of rotations of the motor 21a (22a-24a) of the propeller 21 (22-24).

Simultaneously, the control unit 30 can boost a voltage from the power supply unit 31 to a high voltage or a pulse voltage and apply it to the respective electrodes 42 (refer to FIG. 5 and FIG. 6) inside the attraction units 40A to 40C of the dust collector 4-1 (4-2-4-4) described below.

Meanwhile, controlled flights of the flying body 2 are roughly divided into automatically-controlled flight and operational controlled flight. The automatically-controlled flight is a flight pattern in which, for example, 3D (three-dimensional) drawing data of a space to be cleaned, prepared in advance, is stored in the control unit 30, and the control unit 30 makes the flying body 2 to fly to a desired position in the space based on the 3D drawing data and a control program. On the other hand, the operational controlled flight is a flight pattern in which the flying body 2 is manually operated from a short distance or a long distance by using an exclusive operating device, a portable operating device, a smartphone, and a GPS, etc. In both of the controlled flights, the flying body 2 can be made to fly in the whole space or at a limited predetermined location or height.

The systems of these automatically-controlled flight and the operational controlled flight are known, and both of these control systems can be applied to the flying body 2.

In the present embodiment, a system that realizes both of the automatically-controlled flight and operational controlled flight is applied. That is, the control unit 30 can control the transformer units 32-1 to 32-4 based on a control program and data of a 3D drawing, etc., stored in the memory 30a. It is also possible that a command radio wave from the outside or a radio wave from the GPS are received by the receiving unit 34 via the antenna 35, and based on the received radio wave, the control unit 30 controls the transformer units 32-1 to 32-4 and the booster unit 33.

In FIG. 1 to FIG. 3, the dust collectors 4-1 to 4-4 are devices to electrostatically attract dust in the air, and as shown in FIG. 4, each dust collector 4-1 (4-2-4-4) includes three attraction units 40A to 40C fitted to the propeller 21

(22-24), and the power supply unit 31 and the booster unit 33 inside the main body unit 20.

Figure 5:
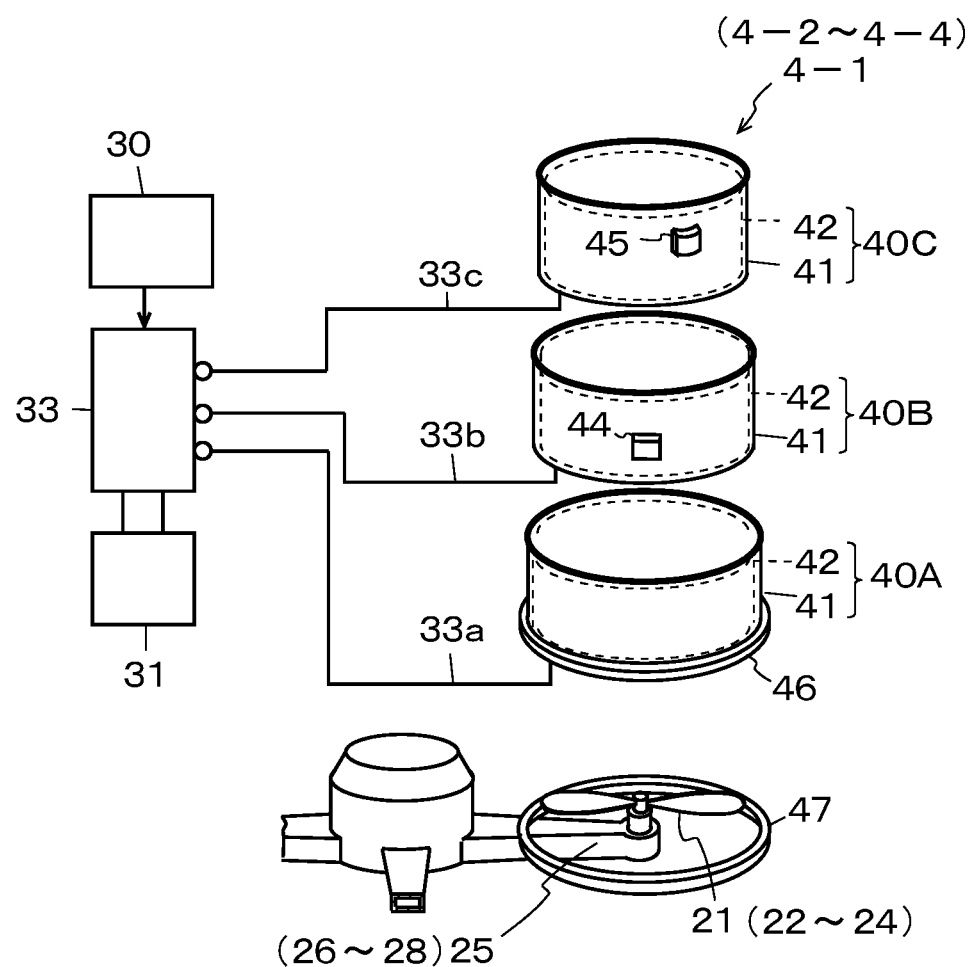
FIG. 5 is an exploded perspective view showing attraction units.
Figure 6:
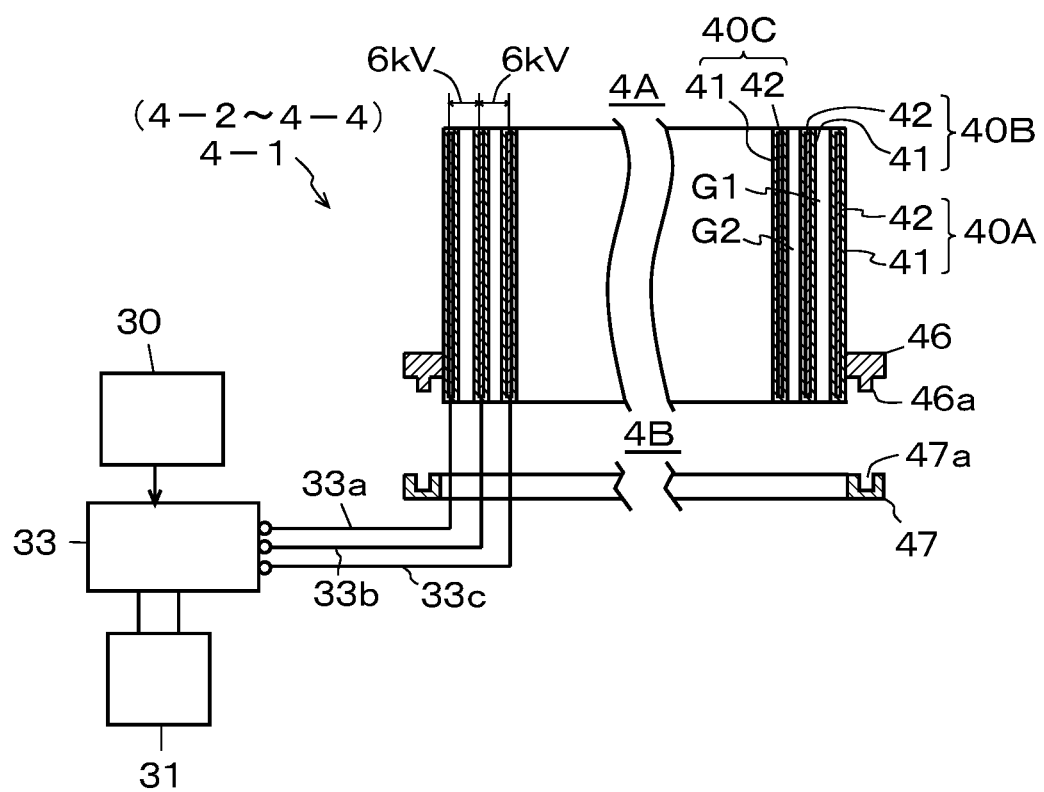
FIG. 6 is a sectional view showing the attraction units.

FIG. 5 is an exploded perspective view showing the attraction units 40A to 40C, and FIG. 6 is a sectional view showing the attraction units 40A to 40C.

As shown in FIG. 5, the three attraction units 40A to 40C are cylindrical bodies with diameters different from each other, and the attraction unit 40B is fitted into the attraction unit 40A with the largest diameter, and the attraction unit 40C with the smallest diameter is fitted into the attraction unit 40B. As shown in FIG. 6, these attraction units 40A to 40C are fitted concentrically, a gap G1 with a predetermined width is provided between the attraction units 40A and 40B, and a gap G2 with a predetermined width is provided between the attraction units 40B and 40C. In the present embodiment, an upper opening of the three fitted attraction units 40A to 40C is set as an intake opening 4A of the dust collector 4-1 (4-2-4-4), and a lower opening is set as an exhaust opening 4B.

Each attraction unit 40A (40B, 40C) is structured by covering the electrode 42 by a dielectric 41. Accordingly, the electrodes 42 and 42 of the attraction units 40A and 40B adjacent to each other oppose each other, and the electrodes 42 and 42 of the attraction units 40B and 40C adjacent to each other oppose each other.

The electrode 42 of the attraction unit 40A is connected to the booster unit 33 via the wiring 33a. The electrodes 42 and 42 of the attraction units 40B and 40C are respectively connected to the booster unit 33 via the wirings 33b and 33c. Accordingly, by control of the control unit 30, predetermined voltages are applied from the booster unit 33 to the electrode 42 of the attraction unit 40A and the electrode 42 of the attraction unit 40B to generate a predetermined potential difference between the electrodes 42 and 42 of the attraction units 40A and 40B. Predetermined voltages from the booster unit 33 are also applied to the electrode 42 of the attraction unit 40C and the electrode 42 of the attraction unit 40B to generate a predetermined potential difference between the electrodes 42 and 42 of the attraction units 40C and 40B. In the present embodiment, setting is made so that, for example, a voltage of 6 kV is applied to the electrodes 42 and 42 of the attraction units 40A and 40C, and the electrode 42 of the attraction unit 40B is grounded. Accordingly, a potential difference of 6 kV is generated between the electrodes 42 and 42 of the attraction units 40A and 40B, and the same potential difference of 6 kV is also generated between the electrodes 42 and 42 of the attraction units 40C and 40B.

The attraction units 40A to 40C constructed as described above are joined by spacers 44 and 45 as shown in FIG. 3 to FIG. 5. Specifically, the attraction units 40A and 40B are joined by the spacer 44 inserted into the gap G1, and the attraction units 40B and 40C are joined by the spacer 45 inserted into the gap G2.

Thus, the entirety of the attraction units 40A to 40C joined by the spacers 44 and 45 is fitted to the propeller 21 (22-24).

Specifically, as shown in FIG. 6, a projection portion 46a facing downward is provided to project on a ring 46, and this ring 46 is fixed to a lower end portion outer circumferential surface of the outermost attraction unit 40A. In addition, a recessed portion 47a facing upward is recessed into a ring 47, and this ring 47 is fixed to the frame 25 (26-28). The propeller 21 (22-24) is positioned at the center of this ring 47 (refer to FIG. 5).

The ring 46 is a first magnetic member, and the ring 47 is a second magnetic member.

The rings 46 and 47 have magnetism, and are attached so that a magnetic pole of the ring 46 on the projection portion 46a side and a magnetic pole of the ring 47 on the recessed portion 47a side become opposite to each other.

Accordingly, in a state where the attraction units 40A to 40C are lowered to the propeller 21 (22-24) side, and the ring 46 is brought into contact with the ring 47, the projection portion 46a can be fitted into the recessed portion 47a. By fitting the attraction units 40A to 40C to the propeller 21 (22-24) in this way, the propeller 21 (22-24) can be positioned inside the attraction units 40A to 40C. Upward and downward movements of the attraction units 40A to 40C are prevented by magnetic forces of the rings 46 and 47, and movement in the horizontal direction is prevented by a fitting force between the projection portion 46a and the recessed portion 47a. By pulling up the attraction units 40A to 40C against the magnetic forces of the rings 46 and 47, the attraction units 40A to 40C can be removed from the propeller 21 (22-24).

That is, the attraction units 40A to 40C are removably fitted to the flying body 2 by an attraction force generated by magnetic forces of the rings 46 and 47. Therefore, even when the flying body collides with a certain object, due to an impact of the collision, the attraction units 40A to 40C easily separate from the flying body 2. Therefore the object with which the flying body collided is not damaged by the collision.

In the present embodiment, a projection portion is provided on the ring 46 of the attraction units 40A to 40C, and a recessed portion is provided on the ring 47 on the frame 25 (26-28) side, however, conversely, it is obviously possible that a recessed portion is provided on the ring 46 of the attraction units 40A to 40C, and a projection portion is provided on the ring 47 on the frame 25 (26-28) side.

Next, operation and effects of the air cleaner 1-1 of the present embodiment are described.

Figure 7A:
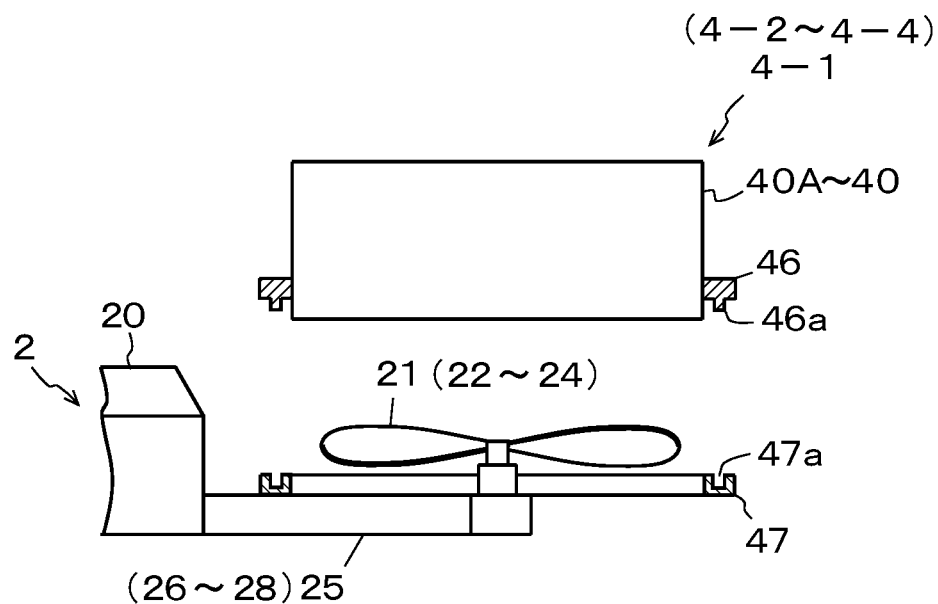
FIG. 7(a) shows a state before the attraction units are fitted or a state after the attraction units are removed.
Figure 7B:
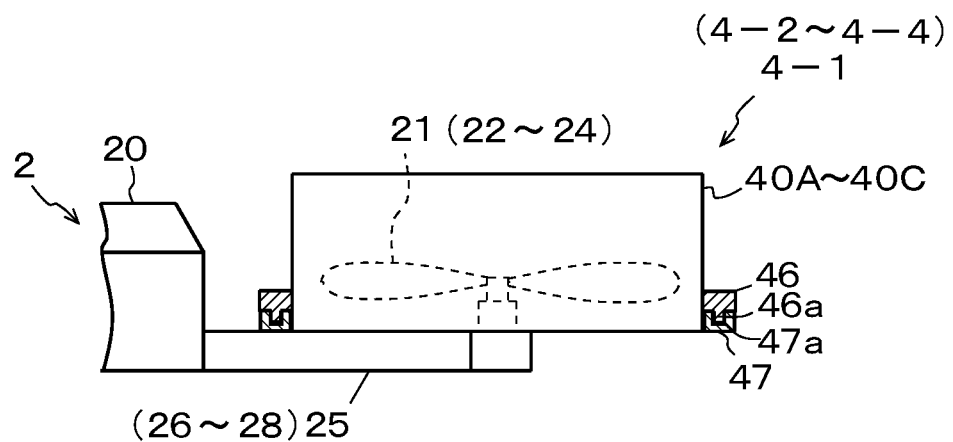
FIG. 7(b) shows a state where the attraction units are fitted.
Figure 8:
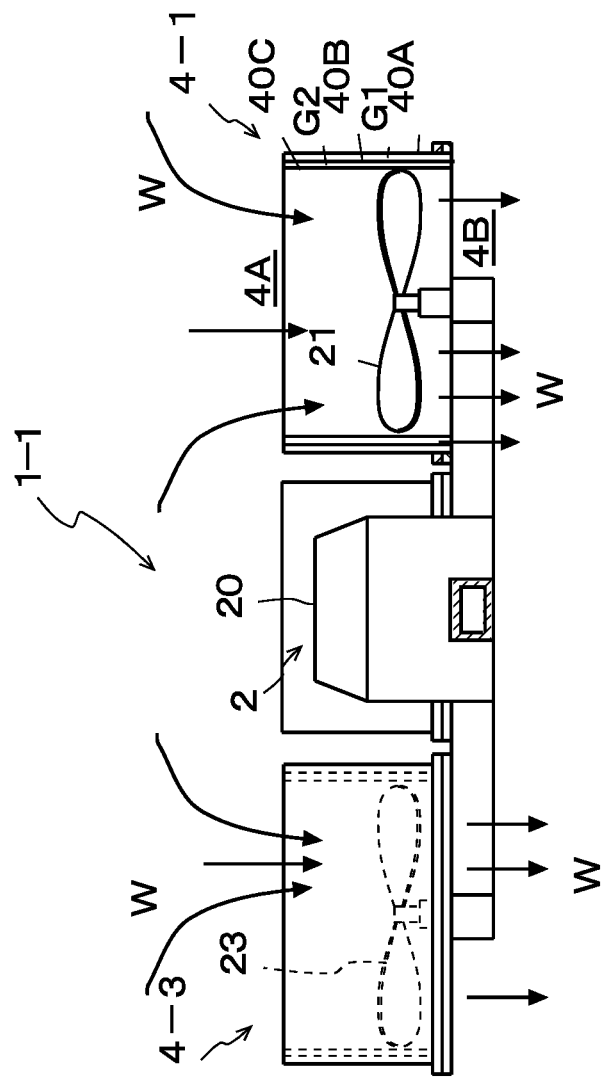
FIG. 8 is a side view describing flying movement of the air cleaner.

FIG. 7 are partial side views showing a method of fitting and removing the attraction units 40A to 40C to and from the propeller 21 (22-24), and FIG. 7(a) shows a state before the attraction units 40A to 40C are fitted or a state after the attraction units are removed, and FIG. 7(b) shows a state where the attraction units 40A to 40C are fitted. FIG. 8 is a side view describing flying movement of the air cleaner 1-1.

Before floating the flying body 2, the attraction units 40A to 40C are fitted to the propeller 21 (22-24) of the flying body 2. That is, as shown in FIG. 7(a), the ring 46 of the attraction units 40A to 40C is lowered from directly above the ring 47 of the flying body 2, and as shown in FIG. 7(b), the projection portion 46a of the ring 46 is fitted into the recessed portion 47a of the ring 47, and accordingly, the attraction units 40A to 40C are fitted to the propeller 21 (22-24).

In this state, by control of the control unit 30 (refer to FIG. 4), when the propellers 21 to 24 are rotated at a desired rotation speed, as shown in FIG. 8, air W at an upper side is suctioned to the propellers 21 to 24 sides, and exhausted to a lower side of the propellers 21 to 24. That is, by rotation of the propellers 21 to 24, an upward propulsion is generated, and the flying body 2 floats up.

At this time, the propeller 21 (22-24) is positioned inside the attraction units 40A to 40C of the dust collector 4-1 (4-2-4-4), so that by an intake force and an exhaust force of the propeller 21 (22-24), air W in a wide surrounding range is forcibly suctioned into the attraction units 40A to 40C through the intake opening 4A, and forcibly exhausted from the exhaust opening 4B. That is, a high-speed air flow of the air W is formed inside the attraction units 40A to 40C, so that the structure in which the attraction units 40A to 40C are fitted to the propeller 21 (22-24) functions as a ducted fan. As a result, propulsion larger than in the case where each of the propellers 21 to 24 is provided alone is obtained.

Figure 9:
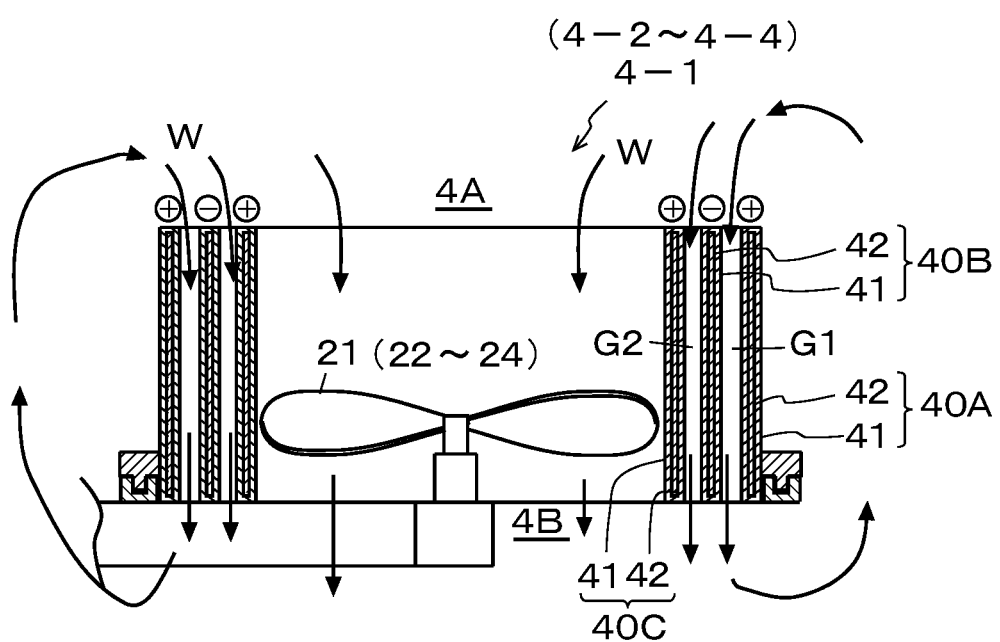
FIG. 9 is a schematic sectional view describing a dust collecting operation.

FIG. 9 is a schematic sectional view describing a dust collection effect.

As described above, the air W around the flying body 2 is forcibly suctioned into the attraction units 40A to 40C by an intake force and an exhaust force of the propeller 21 (22-24). That is, as shown by the arrow in FIG. 9, the air W is suctioned into the attraction units 40A to 40C from the intake opening 4A on the upper side. At this time, due to the structure in which the cylindrical attraction units 40A to 40C are fitted concentrically, the air W suctioned from the intake opening 4A passes through the inside of the attraction unit 40C. In addition, the gap G1 between the attraction units 40A and 40B and the gap G2 between the attraction units 40B and 40C function as air passages, so that the air W passes through not only the inside of the attraction unit 40C but also these gaps G1 and G2.

At this time, when the above-described voltages are applied to the respective electrodes 42 of the attraction units 40A to 40C from the booster unit 33 (refer to FIG. 4) by control of the control unit 30, as described above, a potential difference of 6 kV is generated between the electrodes 42 and 42 of the attraction units 40A and 40B and between the electrodes 42 and 42 of the attraction units 40C and 40B. Therefore, the attraction units 40A and 40C are electrically charged with positive polarity, and the attraction unit 40B is electrically charged with negative polarity.

Therefore, when the air W passes through the inside of the attraction unit 40C and the gaps G1 and G2, electrically charged dust contained in the air W is attracted by the electrically charged attraction units 40A to 40C by an electrostatic force. Specifically, dust electrically charged with negative polarity is attracted to surfaces of the attraction units 40A and 40C, and dust electrically charged with positive polarity is attracted to a surface of the attraction unit 40B. Thereafter, the air W that has passed through the inside of the attraction unit 40C and the gaps G1 and G2 is exhausted to the lower side from the exhaust opening 4B of the attraction units 40A to 40C. Further, the air W that has been exhausted from the exhaust opening 4B is forcibly taken in again from the intake opening 4A by the propeller 21 (22-24), and an air flow of the air W circulates through the surroundings of the attraction units 40A to 40C and the inside of the attraction units 40A to 40C.

In this way, the air cleaner 1-1 of the present embodiment is structured so that surrounding air W is forcibly flowed into the attraction units 40A to 40C by rotation of the propeller 21 (22-24), so that even when the air cleaner 1-1 is at a low speed and does not move around very much as in a hovering state, it can sufficiently collect dust in the air.

By moving the air cleaner 1-1 in a floating state as shown in FIG. 8, it can move around in a large space to be cleaned, and a large amount of dust in the large space can be collected by the attraction units 40A to 40C.

Meanwhile, in the case where the air cleaner 1-1 moves around in the space, even when the attraction units 40A to 40C are fitted to a portion other than the propeller 21 (22-24), for example, the main body unit 20, etc., the air W passes through the inside of the attraction unit 40C and the gaps G1 and G2, so that dust collection is possible.

However, the dust collection rate per unit time by the attraction units 40A to 40C corresponds to a speed of flowing of the air W into the attraction unit 40C and the gaps G1 and G2. Therefore, like the air cleaner described in Patent Literature 2, when the attraction units 40A to 40C are fitted to a portion other than the propeller 22 (22-24), only a dust collection rate corresponding to a moving speed of the air cleaner can be obtained.

However, in the air cleaner 1-1 of the present embodiment, the air W flows into the attraction unit 40C and the gaps G1 and G2 at a speed as a sum of a moving speed of the air cleaner 1-1 and a speed of air flowing in caused by the propeller 21 (22-24). Therefore, the air W at a high speed flows into the attraction unit 40C and the gaps G1 and G2, so that the dust collection rate per unit time by the attraction units 40A to 40C becomes very high. As a result, air W in a wider range can be taken into the dust collector 4-1 (4-2-4-4).

In addition, the dust collection rate corresponds to a contact area between the air W and the attraction unit. The air cleaner 1-1 of the present embodiment is structured to bring the air W into contact with the three attraction units 40A to 40C, so that a contact area between the air W and the attraction units is large. Therefore, in this respect as well, a higher dust as collection rate per unit time can be obtained.

The air cleaner 1-1 of the present embodiment can be caused to make a controlled flight in various spaces to be cleaned. As an example, the following controlled flight is possible.

That is, in order to periodically clean a dangerous space to be cleaned where no GPS signal reaches, first, the air cleaner 1-1 is made to fly by transmitting a command radio wave from the outside to the air cleaner 1-1 by using an operating device (not shown). Then, data on a flight path that realizes efficient dust collection is collected, and 3D drawing data of the flight path is stored in the memory 30a (refer to FIG. 4).

Thereafter, the control unit 30 controls the transformer units 32-1 to 32-4 based on the 3D drawing data stored in the memory 30a, the air cleaner 1-1 automatically flies around in the flight path shown by the 3D drawing data to efficiently collect dust in the air.

Dust collection by this flight is performed by electrostatically attracting dust in the air by the attraction units 40A to 40C, so that unlike the air cleaner described in Patent Literature 1, even very small dust not larger than 1 µm can be strongly attracted. Therefore, dust that has been once collected does not drop due to wind or a slight impact on the air cleaner 1-1.

In addition, the air cleaner 1-1 of the present embodiment can be used not only as a dust collecting device but also as a sterilization device. That is, in FIG. 4, by controlling the output voltage of the booster unit 33 so that a high voltage is applied to the electrodes 42 of the attraction units 40A to 40C from the booster unit 33, ions and ozone can be generated from the attraction units 40A to 40C. Accordingly, sterilization, etc., of the surroundings of the air cleaner 1-1 can be performed.

In this way, even when the dust collectors 4-1 to 4-4 of the air cleaner 1-1 are set to have high-voltage specifications, unlike the air cleaner described in Patent Literature 2, the lengths and the diameters of the attraction units 40A to 40C do not need to be increased.

In the air cleaner 1-1 that has landed after finishing a cleaning operation, a large amount of dust is attached to the attraction units 40A to 40C of the dust collector 4-1 (4-2-4-4).

When the air cleaner 1-1 lands, as shown in FIG. 7(b), since the attraction units 40A to 40C are fitted to the propeller 21 (22-24), the attraction units 40A to 40C can be removed from the propeller 21 (22-24) by being lifted up. At this time, by stopping voltage application to the attraction units 40A to 40C, the large amount of dust attached to the attraction units 40A to 40C can be dropped or wiped off.

In the present embodiment, as shown in FIG. 4 to FIG. 6, the three cylindrical attraction units 40A to 40C, the booster unit 33, and the power supply unit 31 constitute the dust collector 4-1 (4-2-4-4), however, the number of cylindrical attraction units is not limited to three. Two or four or more attraction units may be used as members constituting the dust collector 4-1 (4-2-4-4).

In the present embodiment, the attraction units 40A to 40C are fitted to the propeller 21 (22-24) so that the propeller 21 (22-24) of the flying body 2 is positioned inside, however, the construction is not limited to this.

Figure 10A:
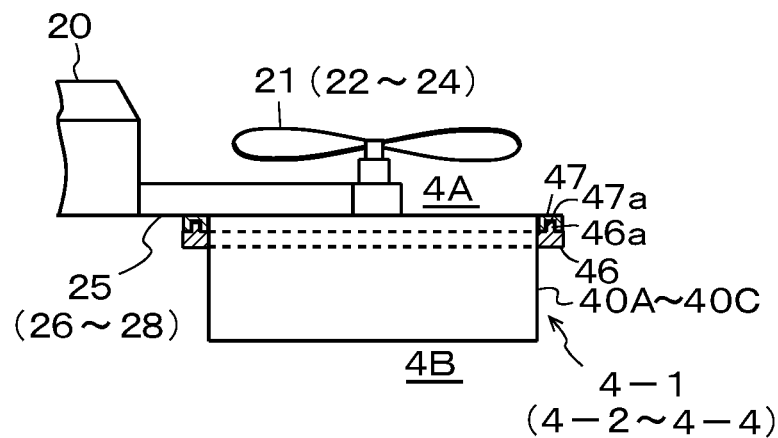
FIG. 10(a) shows an example in which a propeller is positioned near an intake opening of the attraction units.
Figure 10B:
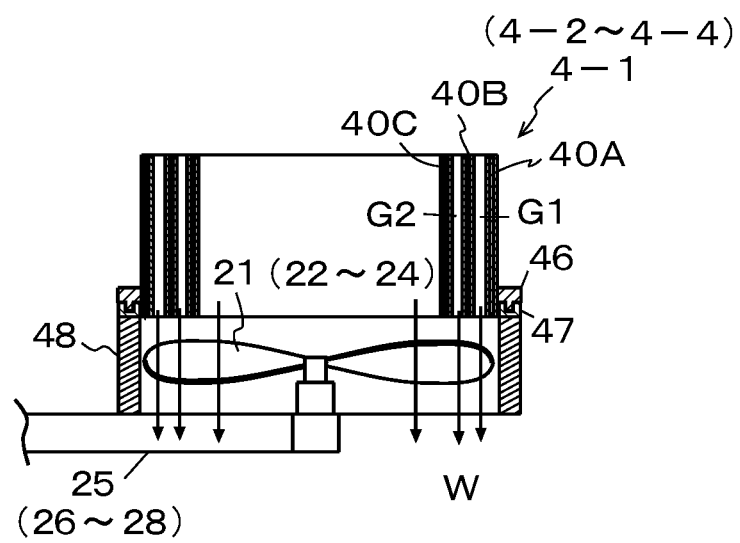
FIG. 10(b) shows an example in which the propeller is positioned near an exhaust opening of the attraction units.

FIG. 10 are partial side views showing modifications of an attaching position of the attraction units 40A to 40C, and FIG. 10(*a*) shows an example in which the propeller 21 (22-24) is positioned near the intake opening 4A of the attraction units 40A to 40C, and FIG. 10(*b*) shows an example in which the propeller 21 is positioned near the exhaust opening 4B of the attraction units 40A to 40C.

That is, as shown in FIG. 10(*a*), a ring 47 with a recessed portion 47*a* facing downward is fixed to a lower side of the frame 25 (26-28). Then, a ring 46 with a projection portion 46*a* facing upward of the attraction units 40A to 40C is brought into contact with the ring 47, and the projection portion 46*a* is fitted in the recessed portion 47*a*. By this fitting of the attraction units 40A to 40C, the propeller 21 (22-24) is positioned near the intake opening 4A of the attraction units 40A to 40C.

Alternatively, as shown in FIG. 10(*b*), a cylindrical body 48 is fixed to an upper side of the frame 25 (26-28), and a ring 47 is positioned near the propeller 21 (22-24) by being fixed to an upper end of the cylindrical body 48. Then, the ring 46 of the attraction units 40A to 40C is fitted to the ring 47. By this fitting of the attraction units 40A to 40C, the propeller 21 (22-24) is positioned near the exhaust opening 4B of the attraction units 40A to 40C.

Accordingly, air W around the flying body 2 passes through the inside of the attraction unit 40C and the gaps G1 and G2, and then passes through the inside of the cylindrical body 48 and is strongly exhausted to the outside.

(Second Embodiment)

Next, a second embodiment of the present invention is described.

Figure 11:
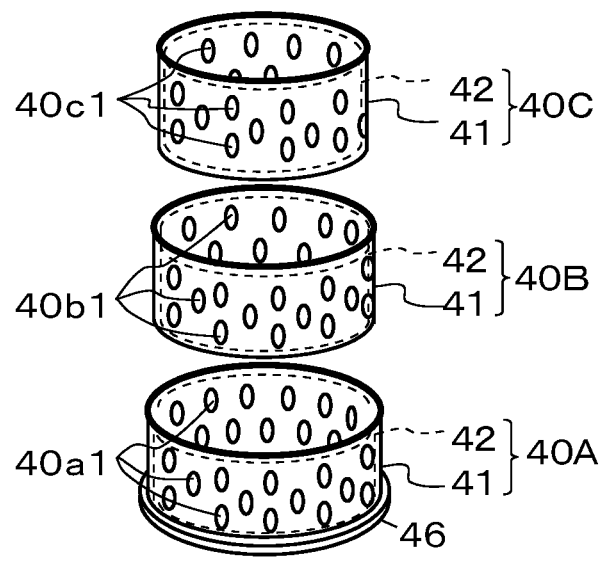
FIG. 11 is an exploded perspective view of attraction units as an essential portion of an air cleaner according to a second embodiment of the present invention.
Figure 12:
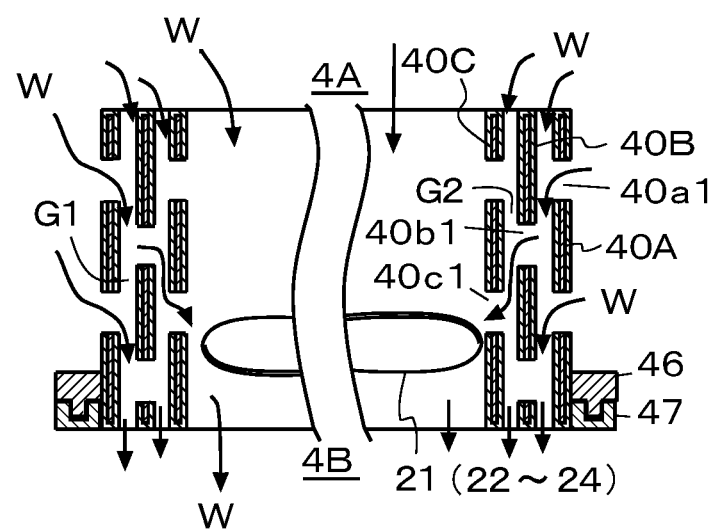
FIG. 12 is a sectional view of the attraction units.

FIG. 11 is an exploded perspective view of attraction units as an essential portion of an air cleaner according to the second embodiment of the present invention, and FIG. 12 is a sectional view of the attraction units.

As shown in FIG. 11, the attraction units 40A to 40C applied to the air cleaner of the present embodiment are different from the attraction units of the first embodiment described above in that the attraction units have a plurality of holes.

Specifically, in the attraction unit 40A, a number of circular or oval holes 40*a*1 that penetrate through the dielectric 41 and the electrode 42 are opened. In each of the attraction units 40B and 40C, a number of circular or oval holes 40*b*1, 40*c*1 that penetrate through the dielectric 4 and the electrode 42 are opened.

In the first embodiment, as shown in FIG. 9, when the propeller 21 (22-24) is rotated, air W is taken in from the intake opening 4A, and this air W passes through the inside of the attraction unit 40C and the gaps G1 and G2, independently.

On the other hand, in the present embodiment, a number of holes 40*a*1 to 40*c*1 are opened in the attraction units 40A to 40C, so that as shown in FIG. 12, the air W taken in from the intake opening 4A passes through not only the inside of the attraction unit 40C and the gaps G1 and G2 but also the holes 40*a*1 to 40*c*1, and is accordingly branched to the propeller 21 (22-24) side. In addition, the air W flows in from not only the intake opening 4A but also the holes 40*a*1 of the outer attraction unit 40A, and as much as an increase in air flow rate, the dust collection rate increases.

Figure 13A:
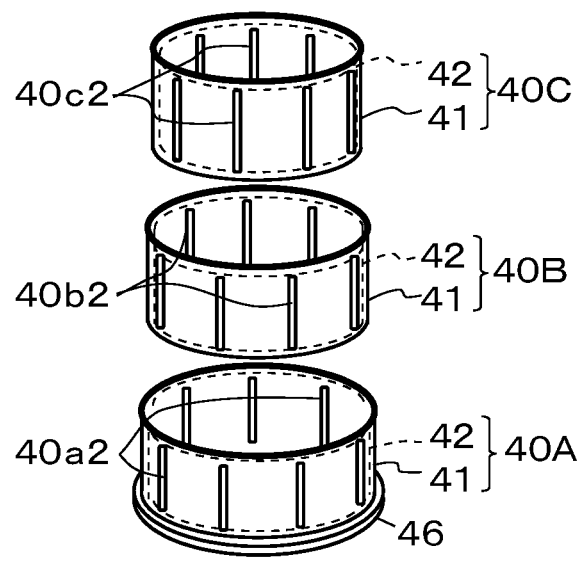
FIG. 13(a) shows a first modification.
Figure 13B:
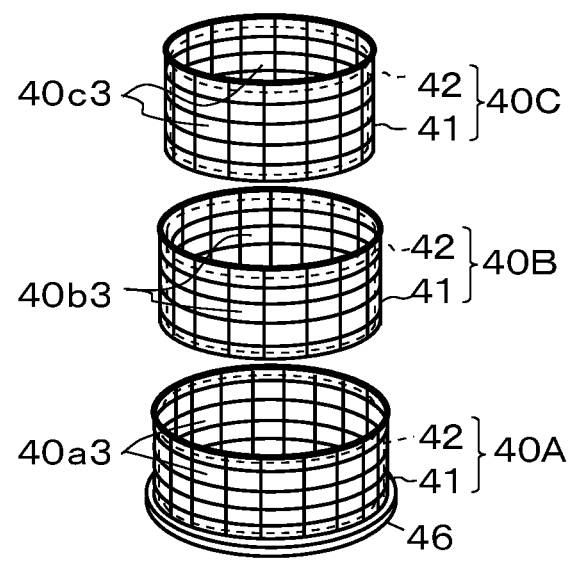
FIG. 13(b) shows a second modification.
Figure 14:
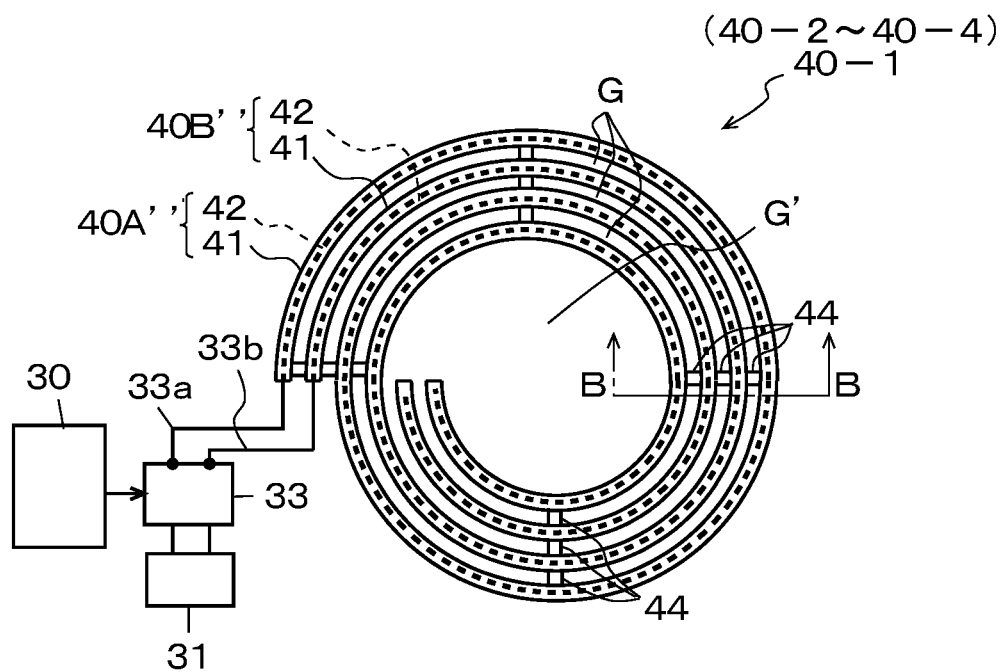
FIG. 14 is a plan view showing attraction units as an essential portion of an air cleaner according to a third embodiment of the present invention.

In the present embodiment, circular or oval holes 40*a*1 (40*b*1, 40*c*1) are provided in the attraction unit 40A (40B, 40C), however, the holes are not limited to be circular or oval. As shown in FIG. 13 and FIG. 14, various holes can be provided in the attraction units 40A to 40C.

FIG. 13 are exploded perspective views showing modifications of the second embodiment, and FIG. 13(*a*) shows a first modification, and FIG. 13(*b*) shows a second modification.

The attraction units 40A to 40C shown in FIG. 13(*a*) have a plurality of slit-shaped holes.

Specifically, in the attraction unit 40A, a plurality of vertically long slit-shaped holes 40*a* that penetrate through the dielectric 41 and the electrode 42 are opened at fixed intervals in a circumferential direction. In each of the attraction units 40B and 40C, a plurality of vertically long slit-shaped holes 40*b*2, 40*c*2 that penetrate through the dielectric 41 and the electrode 42 are opened at fixed intervals in a circumferential direction.

On the other hand, in the attraction units 40A to 40C shown in FIG. 13(*b*), each attraction unit 40A (40B, 40C) is formed to be reticulated.

Specifically, in the attraction unit 40A, a number of rectangular holes 40*a*3 that penetrate through the dielectric 41 and the electrode 42 and are proximal to each other are opened all over the attraction unit 40A. In each of the attraction units 40B and 40C, a number of rectangular holes 40*b*3, 40*c*3 that penetrate through the dielectric 41 and the electrode 42 and are proximal to each other are opened all over the attraction units 40B, 40C.

Other constructions, operations, and effects are the same as those in the first embodiment described above, and description thereof is omitted.

(Third Embodiment)

Next, a third embodiment of the present invention is described.

Figure 15:
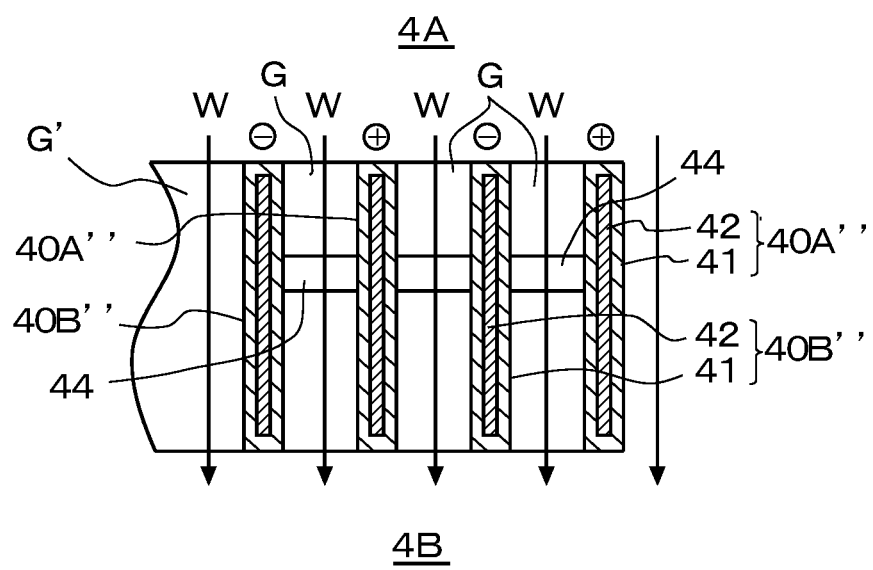
FIG. 15 is a sectional view taken along arrow B-B in FIG. 14.

FIG. 14 is a plan view showing attraction units as an essential portion of an air cleaner according to the third embodiment of the present invention, and FIG. 15 is a sectional view taken along arrow B-B in FIG. 14.

As shown in FIG. 14, in a dust collector 40-1 (40-2-40-4) applied to the air cleaner of the present embodiment, attraction units 40A" and 40B" formed spirally are different from the attraction units of the first to third embodiments.

Specifically, a pair of attraction units 40A" and 40B" are formed into sheet shapes, and in each attraction unit 40A" (40B"), the electrode 42 is covered by the dielectric 41. These attraction units 40A" and 40B" are rolled spirally, and a gap G is formed between the attraction units 40A" and 40B" by spacers 44. Accordingly, the electrode 42 of the attraction unit 40A" and the electrode 42 of the attraction unit 40B" oppose each other across the gap G.

In addition, the electrode 42 of the attraction unit 40A" and the electrode 42 of the attraction unit 40B" are connected to the booster unit 33 via wirings 33*a* and 33*b*, respectively.

Accordingly, when power supply voltages boosted by the booster unit 33, for example, voltages of 6 kV and 0 kV are applied to the electrodes 42 and 42 of the attraction units 40A″ and 40B″, a potential difference is generated between the electrodes 42 and 42 opposing each other, and as shown in FIG. 15, the attraction unit 40A″ is electrically charged with positive polarity, and the attraction unit 40B″ is electrically charged with negative polarity.

With this construction, by fitting the attraction units 40A″ and 40B″ near the propeller 21 (22-24) (refer to FIG. 1, etc.), surrounding air can be forcibly taken in from the intake opening 4A, and exhausted from the exhaust opening 4B through the gap G and a central space G′ of the attraction units 40A″ and 40B″. Dust in the air is electrostatically attracted to surfaces of the attraction units 40A″ and 40B″ while passing through the central space G′ and the gap G.

Other constructions, operations, and effects are the same as those in the first to third embodiments described above, and description thereof is omitted.

(Fourth Embodiment)

Next, a fourth embodiment of the present invention is described.

Figure 16:
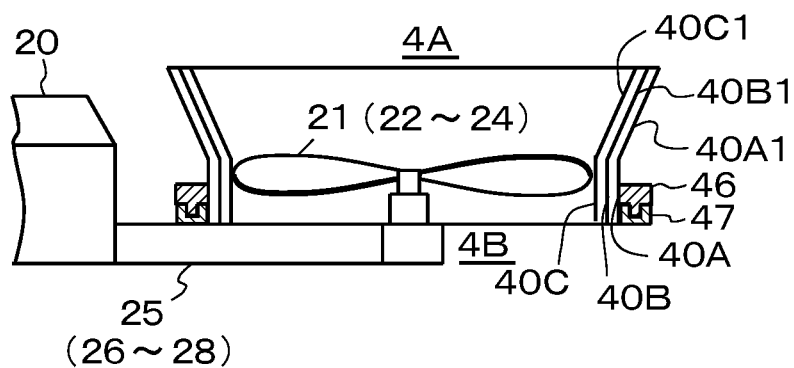
FIG. 16 is a schematic sectional view showing an essential portion of an air cleaner according to a fourth embodiment of the present invention.

FIG. 16 is a schematic sectional view showing an essential portion of an air cleaner according to the fourth embodiment of the present invention.

As shown in FIG. 16, attraction units 40A to 40C applied to the air cleaner of the present embodiment are different from those in the first and second embodiments in that a portion on the intake opening 4A side is tapered.

That is, upper half portions 40A1 to 40C1 of the attraction units 40A to 40C are expanded by being tapered, and an opening diameter of the intake opening 4A is larger than an opening diameter of the exhaust opening 4B.

With this construction, by rotation of the propeller 21 (22-24), a large amount of air is smoothly suctioned into the attraction units 40A to 40C from the intake opening 4A with the large diameter, and forcibly exhausted from the exhaust opening 4B.

Figure 17:
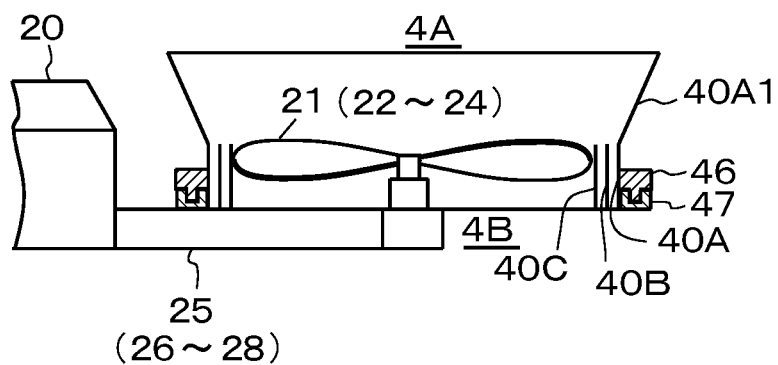
FIG. 17 is a schematic sectional view showing a modification of the fourth embodiment.

FIG. 17 is a schematic sectional view showing a modification of the fourth embodiment.

As described above, in the present embodiment, all upper half portions 40A1 to 40C1 of the attraction units 40A to 40C are tapered, however, the construction is not limited to this. Even when any of the upper half portions 40A1 to 40C1 of the attraction units 40A to 40C is tapered, the same operation and effects can be obtained.

For example, as shown in FIG. 17, only the upper half portion 40A1 of the attraction unit 40A among the attraction units 40A to 40C may be tapered.

Other constructions, operations, and effects are the same as those in the first and second embodiments described above, and description thereof is omitted.

(Fifth Embodiment)

Next, a fifth embodiment of the present invention is described.

Figure 18:
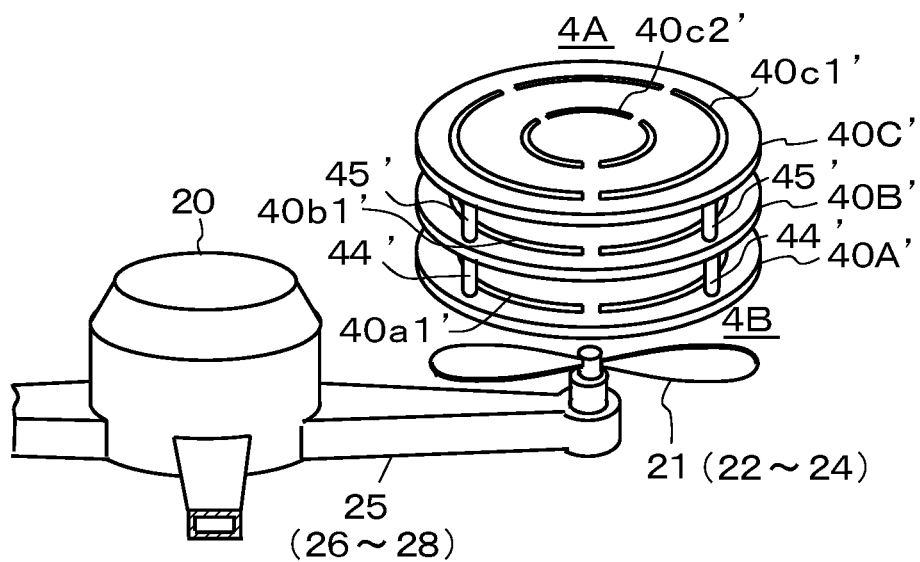
FIG. 18 is a perspective view showing an essential portion of an air cleaner according to a fifth embodiment of the present invention.
Figure 19:
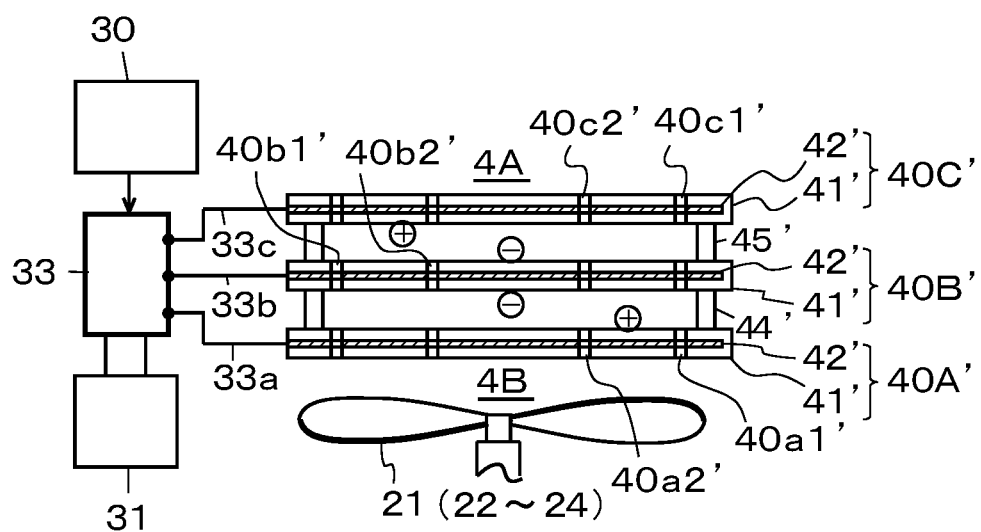
FIG. 19 is a sectional view showing the essential portion.

FIG. 18 is a perspective view showing an essential portion of an air cleaner according to the fifth embodiment of the present invention, and FIG. 19 is a sectional view showing the essential portion.

As shown in FIG. 18, the air cleaner of the present embodiment has a different structure of attraction units from those in the first to fourth embodiments.

That is, in the present embodiment, three sheet-shaped attraction units 40A′ to 40C′ are aligned at even intervals in a thickness direction (upward direction in the drawing).

Specifically, each attraction unit 40A′ (40B′, 40C′) is formed to be circular, and the attraction units 40A′ and 40B′ are joined by spacers 44′, and the attraction units 40B′ and 40C′ are joined by spacers 45′. Then, the entirety of the attraction units 40A′ to 40C′ is fitted to a position directly above the propeller 21 (22-24).

As shown in FIG. 19, an outer circumferential hole 40a1′ (40b1′, 40c1′) and an inner circumferential hole 40a2′ (40b2′, 40c2′) are provided in the attraction unit 40A′ (40B′, 40C′), and the holes 40c1′ and 40c2′ of the attraction unit 40C′ in the uppermost stage are set as the intake opening 4A, and the holes 40a1′ and 40a2′ of the attraction unit 40A′ in the lowermost stage are set as the exhaust opening 4B.

Each attraction unit 40A′ (40B′, 40C′) includes a sheet-shaped circular dielectric 41′, and an electrode 42′ provided inside the dielectric 41′, and the electrode 42′ of the attraction unit 40A′ (40B′, 40C′) is connected to the booster unit 33 via a wiring 33a (33b, 33c).

Accordingly, when power supply voltages boosted by the booster unit 33, for example, voltages of 6 kV, 0 kV, and 6 kV are respectively applied to the electrodes 42′, 42′, and 42′ of the attraction units 40A′ to 40C′, a potential difference is generated between the electrode 42′ and 42′ of the attraction units 40A′ and 40B′ opposing each other and between the electrodes 42′ and 42′ of the attraction units 40C′ and 40B′ opposing each other, the attraction units 40A′ and 40C′ are electrically charged with positive polarity, and the attraction unit 40B′ is electrically charged with negative polarity.

With this construction, when the propeller 21 (22-24) is rotated, surrounding air flows from the holes 40c1′ and 40c2′ of the attraction unit 40C′, serving as the intake opening 4A, toward the attraction unit 40B′ in the lower stage. Then, the air passes through the holes 40b′ and 40b2′ of the attraction unit 40B′ and reaches the attraction unit 40A′ in the lowermost stage, and is exhausted from the holes 40a1′ and 40a2′ serving as the exhaust opening 4B. When the air passes through the attraction units 40A′ to 40C′, dust in the air is electrostatically attracted by the attraction units 40A′ to 40C′.

Figure 20:
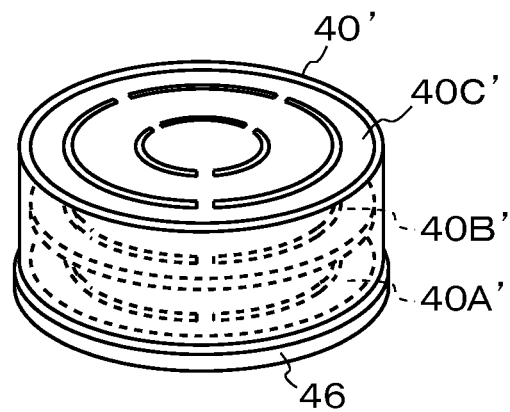
FIG. 20 is a perspective view showing a modification of the fifth embodiment.

FIG. 20 is a perspective view showing a modification of the fifth embodiment.

In the description above, an example in which the attraction units 40A′ to 40C′ are joined by the spacers 44′ and 45′ is shown, and it is also possible that, as shown in FIG. 20, the attraction units 40A′ to 40C′ are incorporated inside a cylindrical body 40′ having a ring 46.

Other constructions, operations, and effects are the same as those in the first to fourth embodiments described above, and description thereof is omitted.

(Sixth Embodiment)

Next, a sixth embodiment of the present invention is described.

Figure 21:
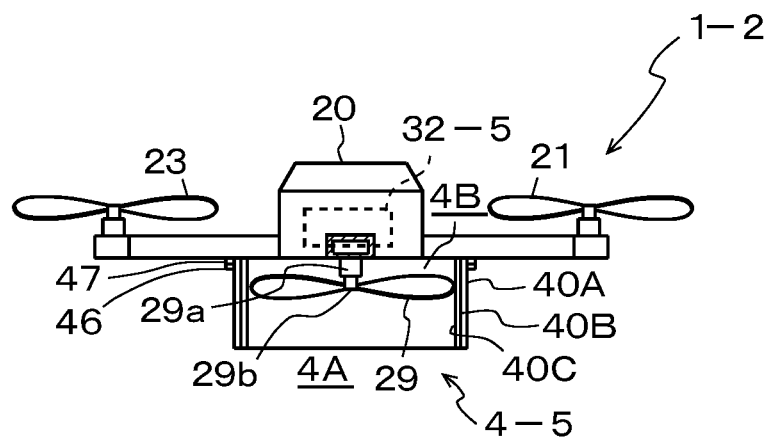
FIG. 21 is a partially cutaway schematic side view of an air cleaner according to a sixth embodiment of the present invention.
Figure 22:
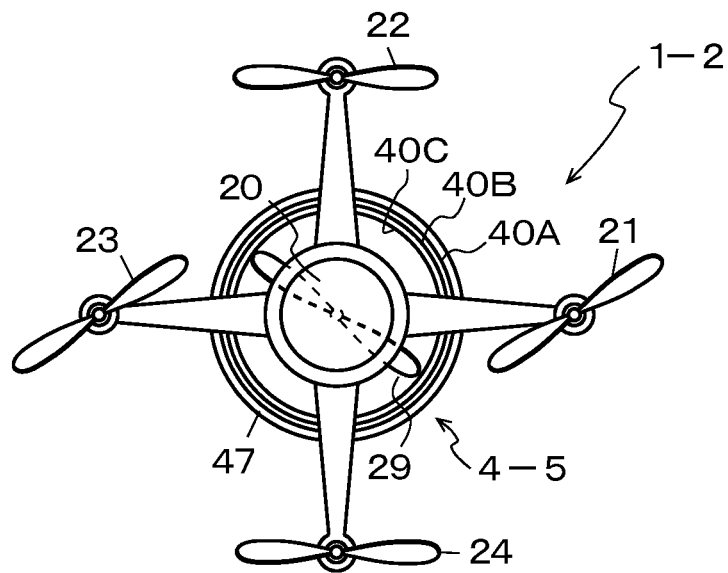
FIG. 22 is a plan view of the air cleaner.

FIG. 21 is a partially cutaway schematic side view showing an air cleaner according to the sixth embodiment of the present invention, and FIG. 22 is a plan view of the air cleaner.

As shown in these drawings, the air cleaner 1-2 of the present embodiment is different from those in the first to fifth embodiments in that the air cleaner 1-2 of the present embodiment includes a propeller 29 facing downward and a dust collector 4-5.

Specifically, a motor 29a is attached to the center of a lower surface of the main body unit 20, and a propeller 29 is fixed to a rotary shaft 29b of the motor 29a.

This propeller 29 has a function to take in air from a lower side and exhaust the air to an upper side by its rotation, unlike the propellers 21 to 24.

In the main body unit 20, in addition to the transformer units 32-1 to 32-4 (refer to FIG. 4), a transformer unit 32-5 with the same structure is provided, and the motor 29a is connected to this transformer unit 32-5 via a wiring (not shown). This transformer unit 32-5 is also connected to the control unit 30 (refer to FIG. 4), and accordingly, by the control unit 30, a rotation speed of the propeller 29 is controlled via the transformer unit 32-5.

In the present embodiment, the dust collectors 4-1 to 4-4 of the embodiments described above are not applied, and only a dust collector 4-5 is applied. The dust collector 4-5 also includes the attraction units 40A to 40C like the dust collectors 4-1 to 4-4, and the attraction units 40A to 40C are fitted only to the propeller 29. The method of fitting to the propeller 29 is the same as the method of fitting to the propeller 21 (22-24). That is, by fitting the ring 46 of the attraction units 40A to 40C to the ring 47 on the lower surface of the main body unit 20, the attraction units 40A to 40C can be fitted to the propeller 29 on the lower surface of the main body unit 20.

As in the case of the first embodiment described above, the electrodes 42, 42, and 42 (not shown) of these attraction units 40A to 40C are also connected to the booster unit 33 (refer to FIG. 4) inside the main body unit 20 via wirings (not shown). That is, the control unit 30 can boost a voltage from the power supply unit 31 to a high voltage or a pulse voltage by the booster unit 33, and apply it to the electrodes 42, 42, and 42 of the attraction units 40A to 40C.

With this construction, by rotating the propellers 21 to 24, the air cleaner 1-2 can be floated up. Then, when the propeller 29 is rotated, air on the lower side is suctioned into the attraction units 40A to 40C from the intake opening 4A by the propeller 29, and dust in the air is collected by the attraction units 40A to 40C of the dust collector 4-5. Then, the air is exhausted to the upper side from the exhaust opening 4B of the attraction units 40A to 40C. Then, the air exhausted to the upper side is taken in and exhausted to the lower side by the propellers 21 to 24. As a result, the air circulates between the propeller 29 and the surrounding propellers 21 to 24 to generate a circulating air flow.

Other constructions, operations, and effects are the same as those in the first to fifth embodiments described above, and description thereof is omitted.

(Seventh Embodiment)

Next, a seventh embodiment of the present invention is described.

Figure 23:
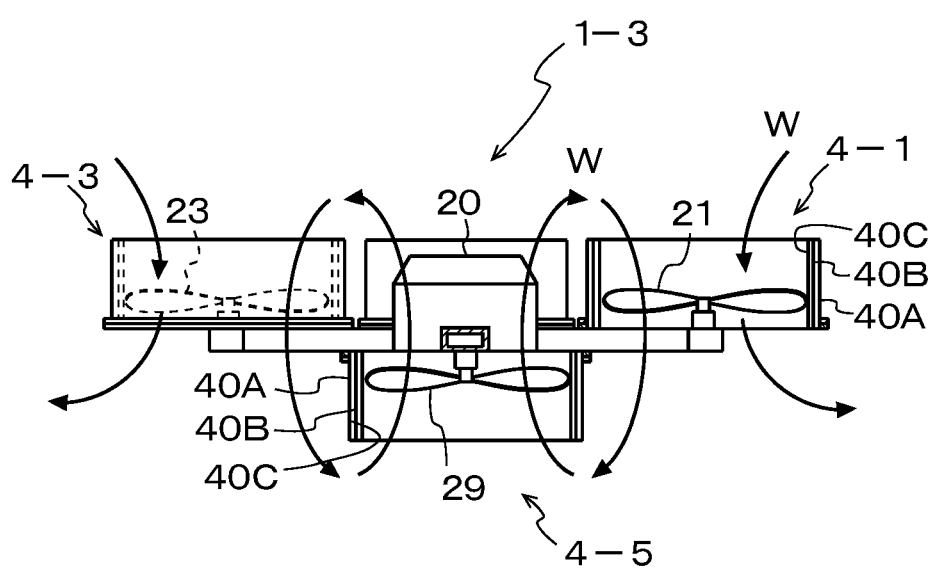
FIG. 23 is a partially cutaway schematic side view of an air cleaner according to a seventh embodiment of the present invention.
Figure 24:
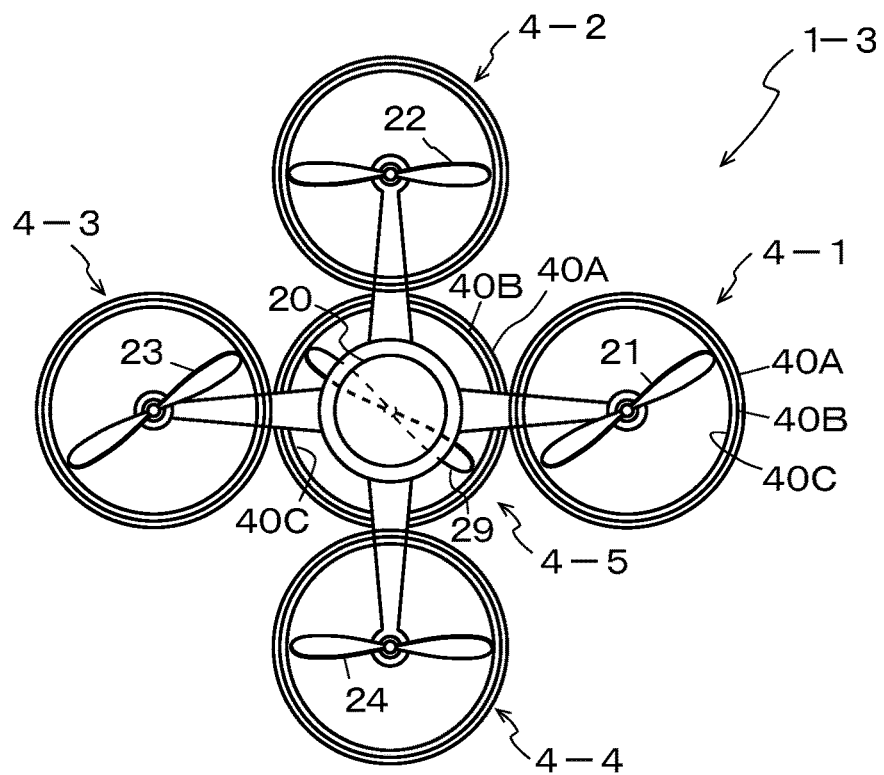
FIG. 24 is a plan view of the air cleaner.

FIG. 23 is a partially cutaway schematic side view showing an air cleaner according to the seventh embodiment of the present invention, and FIG. 24 is a plan view of the air cleaner.

As shown in these drawings, an air cleaner 1-3 of the present embodiment is different from that of the first to sixth embodiments in that the dust collectors 4-1 to 4-4 and 4-5 are fitted to all propellers 21 to 24 and 29.

That is, the attraction units 40A to 40C of the dust collectors 4-1 to 4-4 are respectively fitted to the propellers 21 to 24 in the same manner as in the first embodiment described above, and the attraction units 40A to 40C of the dust collector 4-5 are fitted to the propeller 29 in the same manner as in the sixth embodiment described above.

With this construction, as shown in FIG. 23, air W securely circulates between the propellers 21 to 24 and the propeller 29, so that the dust collection rate by the five dust collectors 4-1 to 4-5 can be significantly increased.

Other constructions, operations, and effects are the same as those in the first to sixth embodiments described above, and description thereof is omitted.

(Eighth Embodiment)

Next, an eighth embodiment of the present invention is described.

Figure 25:
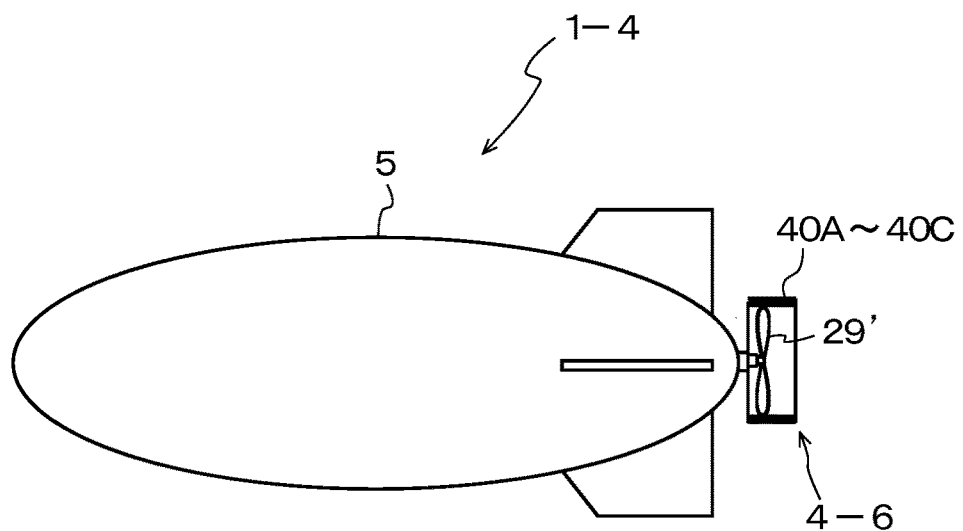
FIG. 25 is a side view showing an air cleaner according to an eighth embodiment of the present invention.

FIG. 25 is a side view showing an air cleaner according to an eighth embodiment of the present invention.

As shown in FIG. 25, an air cleaner 1-4 according to the present embodiment includes a balloon 5 that is propelled by a propeller 29', and a dust collector 4-6.

Specifically, the propeller 29' is provided at a rear portion of the balloon 5, and attraction units 40A to 40C of the dust collector 4-6 are fitted to this propeller 29'.

Electrodes 42, 42, and 42 (not shown) of the attraction units 40A to 40C are connected to the booster unit 33 (not shown), and this booster unit 33 is connected to the power supply unit 31 (not shown), and a voltage of the power supply unit 31 is boosted by the booster unit 33 and applied to each electrode 42 of the attraction units 40A to 40C.

With this construction, by causing the balloon 5 to fly while rotating the propeller 29', air is forcibly taken into the attraction units 40A to 40C. Then, air passes through the inside of the attraction units 40A to 40C and is exhausted, dust in the air is electrostatically attracted by the attraction units 40A to 40C.

Other constructions, operations, and effects are the same as those in the first to seventh embodiments described above, and description thereof is omitted.

The present invention is not limited to the embodiments described above, but can be variously modified or changed within the scope of the spirit of the present invention.

For example, in the embodiments described above, an example in which attraction units 40A to 40C of the dust collector are fitted to all propellers 21 to 24 is shown. However, the attraction units of the dust collector are only required to be fitted to at least one or more propellers of the flying body. Therefore, an air cleaner in which the attraction units 40A to 40C are fitted to only any of the propellers 21 to 24 is also included in the scope of the present invention.

REFERENCE SIGNS LIST

1-1 to 1-4 . . . air cleaner, 2 . . . flying body, 4-1 to 4-6 . . . dust collector, 4A . . . intake opening, 4B . . . exhaust opening, 5 . . . balloon, 20 . . . main body unit, 21 to 24, 29, 29' . . . propeller, 21a to 24a, 29a . . . motor, 21b to 24b, 29b . . . rotary shaft, 25 to 28 . . . frame, 30 . . . control unit, 30a . . . memory, 31 . . . power supply unit, 32-1 to 32-4, 32-5 . . . transformer unit, 32a, 32b, 33a to 33c . . . wiring, 33 . . . booster unit, 34 . . . receiving unit, 35 . . . antenna, 40' . . . cylindrical body, 40A to 40C, 40A' to 40C', 40A", 40B" . . . attraction unit, 40a1 to 40a3, 40b1 to 40b3, 40c1 to 40c3, 40a1' to 40c1', 40a2' to 40c2' . . . hole, 40A1 to 40C1 . . . upper half portion, 41, 41' . . . dielectric, 42, 42a, 42b, 42' . . . electrode, 44, 45, 44', 45' . . . spacer, 46, 47 . . . ring, 46a . . . projection portion, 47a . . . recessed portion, 48a . . . cylindrical body, G, G1, G2 . . . gap, G' . . . central space, H . . . air passage, W . . . air.

The invention claimed is:

1. An air cleaner comprising:
    a flying body that includes a main body unit in which a control unit controlling flying movement is stored, and a propeller disposed outside the main body as propulsion for floating the flying body; and
    a dust collector that is connected to the flying body, and that includes an intake opening and an exhaust opening and electrostatically attracts dust in air flowing from the intake opening to the exhaust opening,
    wherein the propeller of the flying body is disposed inside or under the dust collector to flow air from the intake opening to the exhaust opening, the dust collector comprises a plurality of cylindrical attraction units, each including an electrode, fitted concentrically so that the electrodes adjacent to each other are opposed to each other, and a power supply unit generating a potential difference between the electrodes opposed to each other, and the flying body is a drone structured so that the propeller takes in air from an upper side thereof and exhausts the air to a lower side thereof.

2. The air cleaner according to claim 1, wherein a portion of at least one of the plurality of cylindrical attraction units on a side of the intake opening is expanded by being tapered so that the intake opening of the dust collector has a diameter larger than that of the exhaust opening.

3. An air cleaner comprising:
a flying body that includes a main body unit in which a control unit controlling flying movement is stored, and a propeller disposed outside the main body as propulsion for floating the flying body; and
a dust collector that is connected to the flying body and disposed above the propeller, and that includes an intake opening and an exhaust opening and electrostatically attracts dust in air flowing from the intake opening,
wherein the propeller of the flying body is disposed under the intake opening and the exhaust opening,
the dust collector comprises a plurality of sheet-shaped attraction units, each including an electrode and at least one hole as the intake opening or the exhaust opening, aligned at fixed intervals in an up-down direction, and a power supply unit generating a potential difference between the electrodes adjacent to each other in the up-down direction, and
the flying body is a drone structured so that the propeller takes in air from an upper side thereof and exhausts the air to a lower side thereof.

4. The air cleaner according to claim 1, wherein each of the plurality of attraction units constituting the dust collector includes a plurality of holes.

5. The air cleaner according to claim 4, wherein at least one of the plurality of attraction units is formed to be reticulated.

6. The air cleaner according to claim 1, wherein the dust collector further includes a first magnetic member fixed to the plurality of cylindrical attraction units and the flying body further includes a second magnetic member to engage the first magnetic member, and by an attraction force generated by magnetic forces of the first and second magnetic members, the plurality of cylindrical attraction units is removably fitted to the flying body.

7. The air cleaner according to claim 1, wherein the propeller is disposed between the intake opening and the exhaust opening inside the dust collector,
the dust collector further includes a booster unit between each of the plurality of cylindrical attraction units and the power supply unit to apply predetermined voltages to the electrodes opposed to each other so that one of the electrodes opposed to each other is electrically charged with a positive polarity and another of the electrodes opposed to each other is electrically charged with a negative polarity, and
the plurality of cylindrical attraction units is arranged apart from each other to form a space therebetween, and the air flows from the intake opening to the exhaust opening through the space such that the dust in the air is attracted to the plurality of cylindrical attraction units.

8. The air cleaner according to claim 7, wherein each of the plurality of cylindrical attraction units includes a plurality of through holes to flow air into the space between the plurality of cylindrical attraction units from an outside of the plurality of cylindrical attraction units.

9. The air cleaner according to claim 3, wherein the dust collector further includes a booster unit between each of the plurality of cylindrical attraction units and the power supply unit to apply predetermined voltages to the electrodes adjacent to each other in the up-down direction so that one of the electrodes adjacent to each other in the up-down direction is electrically charged with a positive polarity and another of the electrodes adjacent to each other in the up-down direction is electrically charged with a negative polarity, and
the plurality of cylindrical attraction units includes an upper cylindrical attraction unit having the at least one hole as the intake opening, a lower cylindrical attraction unit having the at least one hole as the exhaust opening, and at least one middle cylindrical attraction unit having the at least one hole as a through hole through which air flows from the intake opening to the exhaust opening.

\* \* \* \* \*